No. 772,312. PATENTED OCT. 11, 1904.
J. FERNAN.
ATTACHMENT FOR GRAIN SEPARATORS.
APPLICATION FILED NOV. 10, 1902.
NO MODEL.
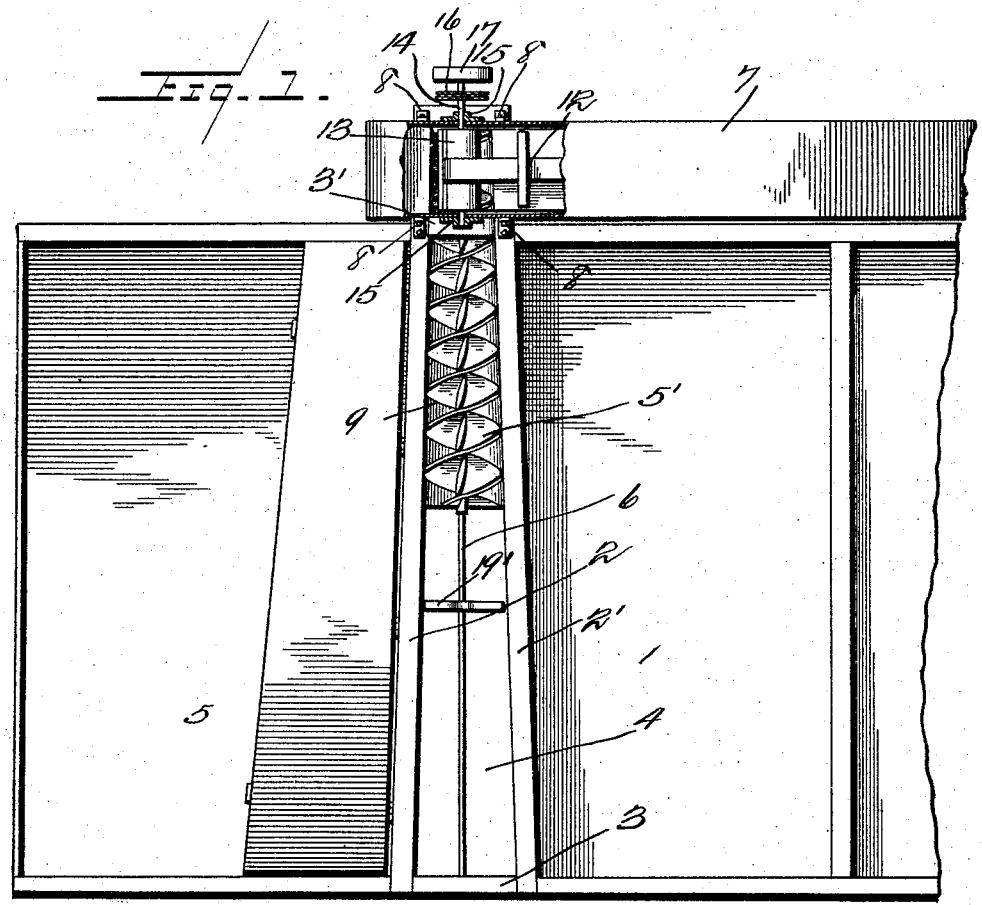
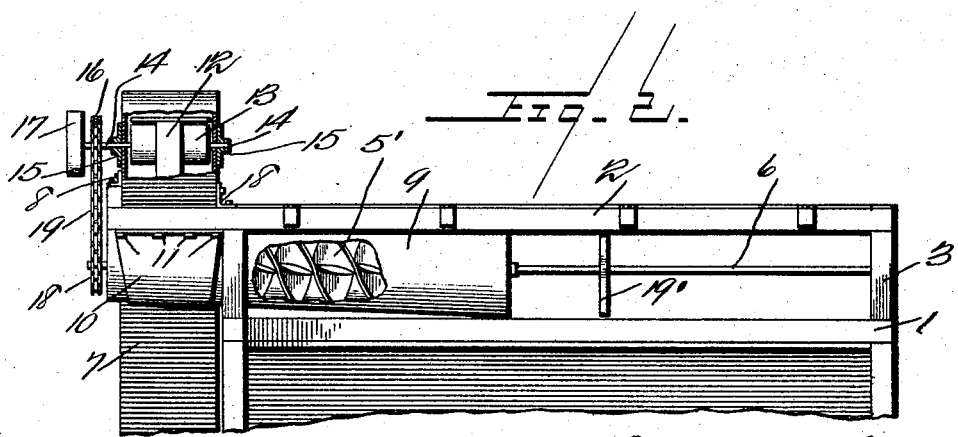
WITNESSES:
INVENTOR
James Fernan
BY
Attorneys No. 772,312. Patented October 11, 1904.

UNITED STATES PATENT OFFICE.

JAMES FERNAN, OF HURON, SOUTH DAKOTA.

ATTACHMENT FOR GRAIN-SEPARATORS.

SPECIFICATION forming part of Letters Patent No. 772,312, dated October 11, 1904.

Application filed November 10, 1902. Serial No. 130,695. (No model.)

*To all whom it may concern:*

Be it known that I, JAMES FERNAN, a resident of Huron, in the county of Beadle, in the State of South Dakota, have invented an Improvement in Machines Commonly Called "Grain-Separators," which improvement is an attachment to the upper end of the grain-elevator to conduct the grain from said point to the cylinder, substituting the commonly-called "spout," of which the following is a specification.

My invention relates to grain-separators, and particularly to the grain-delivery mechanism, and has special reference to a spiral conveyer connected with the end of the usual conveyer.

The object of my invention is to provide a conveyer which can be adjusted so as to regulate the volume of grain to be separated and prevent the scattering and loss of grain in transit.

In the drawings forming a part of the specification, and in which like numerals indicate parts in both views, Figure 1 is a top plan view of the thresher, showing my conveyer mounted within a casing thereon, the top of the same being thrown open. The casing of the endless conveyer, situated at substantially right angles to my attachment and forming a part thereof, is broken away, exposing the interior of the same and its relation to my invention. Fig. 2 is a side elevation showing the spiral conveyer forming a part of my invention and a broken-away portion indicating the arrangement of the conveyer within the cylinder. A front elevation of the endless conveyer is also shown, disclosing the means by which it is attached to the separator and thresher-casing. A portion of the top of the conveyer is broken away, showing the endless belt and means for operating the conveyers.

Referring to the drawings, in Fig. 1, 1 represents the top of the thresher-frame, and 2 2' beams extending vertically across the top of the same, being supported thereon by two horizontal wooden bars 3 3', suitably secured to the said casing and forming a walled casing 4, provided with a hinged cover 5. Seated within the casing 4 and adapted for rotation therein is the spiral conveyer 5', rigidly mounted on shaft 6, journaled at one end in the bar 3, and extends out through the casing 4.

The beams 2 2' extend out beyond the frame 1, and to the said extending portions is secured the endless conveyer 7 by means of angle-irons 8.

The spiral conveyer 5' rotates within a cylinder-tube 9, secured in the casing 4, and with the spiral conveyer extends from a point nearly central of the top 1 and out beyond the thresher-frame 1, the said tube 9 inclining slightly upward, and is held in that position by a curved iron support 10, extending around the outer periphery of the cylinder-tube 9, being secured to the under portions of said beams 2 2' by bolts 11.

The endless conveyer 7, arranged on the side of the thresher-frame at right angles to my spiral conveyer, extends on an angular plane from the lower part of the thresher, being provided with an endless belt 12, adapted to ride on the cylinder 13, mounted on a short shaft 14, secured in bearings 15, provided on the outer sides of the upper end of the conveyer 7. The said shaft 14 extends out of the conveyer 7, and a gear-wheel 16 and belt-wheel 17 are rigidly mounted thereon.

A gear-wheel 18 is mounted on the extended end of the conveyer-shaft 6, and a chain 19 connects the said gear-wheel 16 with the gear-wheel 18, arranged above and in alinement therewith.

Power applied to the belt-wheel 17 will be transmitted to the connected gears 16 and 18, insuring an even rate of speed for both conveyers. A plate 19' is slidably mounted on the shaft 6 within the casing 4 and regulates the amount of grain to be fed in the conveyer, being operated by adjusting the disk backward or forward from the end of the spiral conveyer 5'.

An opening is provided in the bottom of the conveyer 7, and the projecting portion of the tube 9 fits therein. The grain is fed into the conveyer-tube and is carried by the conveyer 5' to the endless conveyer 7, situated at right angles to the said conveyer 5'.

It is readily perceived that grain fed into the spiral conveyer will be transmitted through the same to the endless conveyer at right angles thereto and from thence to the interior of the thresher. The grain thus in transit is protected from scattering. Then, too, the conveyers are operated at a uniform speed and under one operation, the amount of grain being regulated to overcome the jamming and collecting of grain within the conveyers.

What I claim, and desire to secure by Letters Patent, is as follows:

1. In a grain-separator, the combination with a casing, of a cylindrical tube secured therein, and extending without the said casing, a spiral conveyer revolubly mounted therein, an endless conveyer arranged at right angles thereto, the under face of the upper end of said endless conveyer provided with a vertical opening to receive the extended end of the cylindrical tube and means for securing the same in position.

2. In a grain-separator, the combination with a casing, of a plurality of beams forming a part thereof, a cylindrical tube arranged therein, a shaft extending the length of the said casing, and a spiral conveyer mounted thereon, and extending from a point nearly central to the separator-frame, to the outlying ends of the said beams, an endless conveyer secured to the top edges of said outlying beam end, a curved metal support extending around the periphery of the said cylinder, for holding the same flush with the opening provided on the under face of the upper end of said endless conveyer, and means for securing the said support to the said under faces of the projecting ends of said beams.

3. In a grain-separator, the combination with a casing, of a spiral conveyer mounted on a shaft journaled therein, a gear-wheel mounted on one end thereof, an endless conveyer arranged at right angles to said spiral conveyer, a cylinder mounted on a shaft in the upper end of said endless conveyer, an endless belt arranged thereon, a gear-wheel and a power-wheel mounted on the extended portion of said shaft, and a chain connecting the gear-wheel for transmitting motion applied to said power-wheel.

In testimony whereof I have signed my name to this specification in the presence of two subscribing witnesses.

JAMES FERNAN.

Witnesses:
A. A. CHAMBERLAIN,
M. E. WALTON.